Nov. 2, 1926.   1,605,016
W. E. TREZISE
STEREOSCOPIC PHOTOGRAPHY
Filed Feb. 3, 1925

Inventor
William E. Trezise,
by Bright & Bailey
Attorneys

Patented Nov. 2, 1926.

1,605,016

UNITED STATES PATENT OFFICE.

WILLIAM ERNEST TREZISE, OF WOLVERHAMPTON, ENGLAND.

STEREOSCOPIC PHOTOGRAPHY.

Application filed February 3, 1925, Serial No. 6,597, and in Great Britain February 7, 1924.

When an object is viewed by the two eyes, a slightly different impression is made upon each of them and by this means the body of depth is readily perceived, but all other objects in the field of view, either nearer or more remote appear to have a certain measure of displacement, or horizontal parallax.

If these two distinct impressions are recorded photographically upon some sensitized surface all objects at distances other than that of the principal feature will give a double image and the view of these is confusing to the optic sense.

The object of this invention is to produce upon a single plate of film a record of the principal feature as seen from points separated horizontally and to obtain more differentiation of distances without a distinctly double image in the remainder of the field than is possible in a view obtained from one point such as that produced by the ordinary photographic camera.

Broadly a method of photography according to my invention is characterized in that a selected feature of a subject being photographed can be brought into prominence on the negative by focussing on to it from more than one point and passing all or the majority of the rays directly connected with such selected feature through the common focal point of a lens whereby they become superimposed.

It will be apparent that the rays connected with objects surrounding the selected feature whilst passing through the same lens or aperture as the rays connected with the selected feature, will not be in focus, the degree of displacement increasing proportionally to the lateral displacement from the feature brought into focus, thereby obtaining an effect corresponding with the normal human vision.

My invention may be simply explained by assuming the object lens of a camera is a single achromatic lens having a panel in front of it which has symmetrically either side of the imaginary line passing through the axis of the lens and on its horizontal diameter a pair of circular apertures the diameters of which can be varied by any mechanical adjunct. In rear of this lens is provided another lens connected so that rays passing through the two apertures in front of the object lens pass through the same focal point. By using a focussing screen and adjusting the sizes of the apertures in conformity with each other to the desired diameter it will be found that these two apertures can be so adjusted that the rays of a certain feature in the zone of vision can be passed equally through both apertures whereby the two sets of rays are superimposed without displacement on the focal screen thereby bringing the feature into prominence. The diameters of the two apertures can be varied to have the maximum of displacement or can be practically merged into each other so that there is virtually only one aperture.

I have appended herewith two sheets of drawings illustrating diagrammatically embodiments of my invention, and wherein:—

Figure 1:
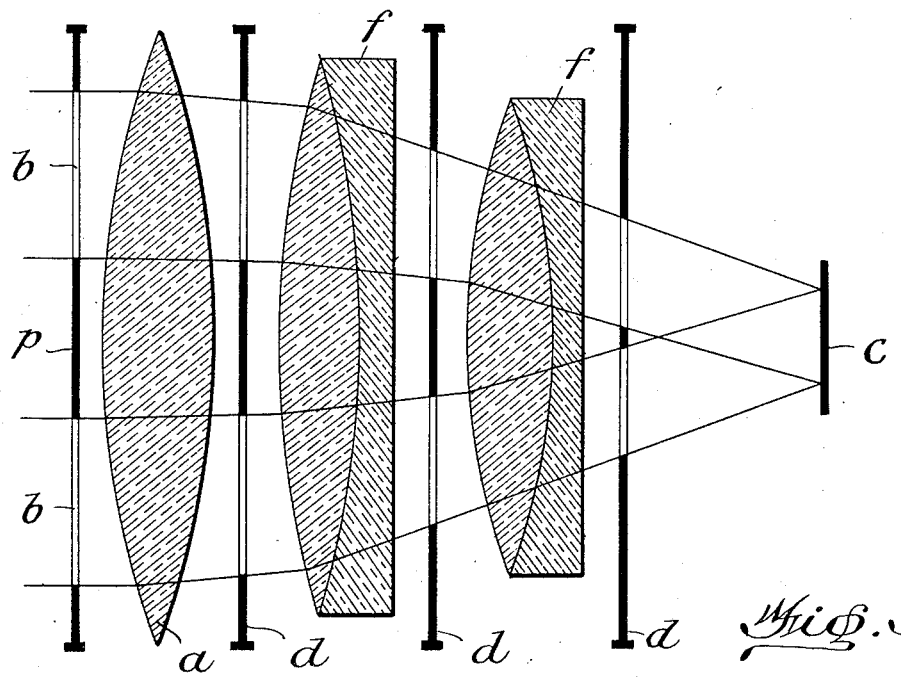
Fig. 1 is a sectional view of a combination of lenses and prisms with diaphragms.
Figure 3:
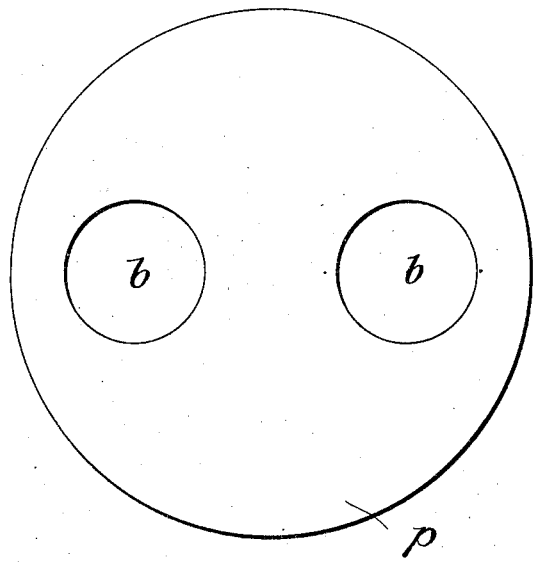
Fig. 3 illustrates a panel for an object lens with a double aperture.

Referring to the drawings, a corrected lens $a$ of large diameter (say $5\frac{1}{4}''$) is employed and two apertures $b$ (Figs. 1 and 3) are symmetrically disposed in a panel $p$ just in front of and upon the horizontal diameter of this lens.

The light rays indicated by a series of parallel lines entering these apertures and passing through the same lens are brought to a focus in the same plane $c$ and the two images are superimposed.

Between the lens $a$ and the sensitized surface $c$ are arranged a series of diaphragms $d$, each having the same number of apertures or stops as has the diaphragm for the apertures $b$ of the lens $a$ and the diameters or areas are preferably in inverse ratio to the distance from the lens. This is to preclude the possibility of divergent rays reaching parts of the plates or films for which they are not intended.

The image may be reduced in size in order to suit the production of cinematograph films.

The reduction may be effected by the interposition of an auxiliary bi-convex or meniscus or other suitable lens $f$.

The objective may be a double convex, plano convex or suitable combination of lenses or any system of reflecting mirrors which may be employed in substitution for, or in conjunction with the same. In the case of lenses the upper and lower segments may be dispensed with; a horizontal strip containing the axis being the necessary portion. Also the central portion of this strip in line with the part of the panel *p* separating the apertures may be permanently obscured, or removed and the space normally occupied by it utilized for any mechanical adjunct.

By means of the above described device two distinct impressions will be recorded upon the same plate or film and produce the desired stereoscopic effect. These records can be projected upon a screen in the customary manner.

In the foregoing embodiment of my invention it will be apparent that the pictures are intended to be taken synchronously, but if desired the exposure through the different apertures may be effected by simple mechanism alternately, the time elapsing between each exposure being a very small fraction of a second. This method would only be intended for adoption for projection with cinematograph films, the reason being that it takes a small fraction of a second for any impression to be made upon the optic nerve, the effect however remaining for a relatively long period, consequently a satisfactory result would be obtained by a rapid alteration of images from the two apertures.

Figure 2:
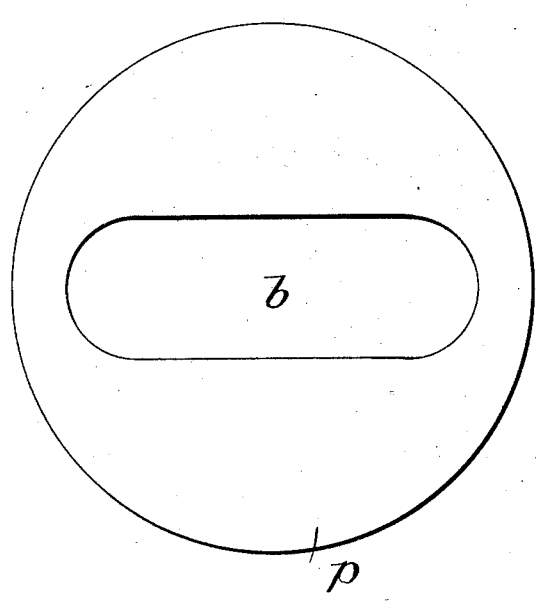
Fig. 2 illustrates a panel for the object lens with a single aperture.

It will be apparent that the portion separating the two apertures in front of the object lens may be dispensed with so that there is virtually only one aperture as shown in Fig. 2.

What I claim is:—

In photographic apparatus, an object lens, a place for the location of a sensitized member, a plurality of screens disposed between said object lens and the place for the location of the sensitized member, each of said screens having a pair of apertures therein, and an additional apertured screen in front of said object lens, the apertures in the screens between said lens and the place for said sensitized member being reduced in area in succession from the screen nearest said lens to the screen nearest the place for the location of the sensitized member, the apertures in all of said screens being symmetrically disposed with respect to the optic axis of said lens, and the axes of corresponding apertures in all of the screens being situated in a common plane containing the optic axis of the lens.

In witness whereof I have signed this specification.

WILLIAM ERNEST TREZISE.